United States Patent
Käter et al.

(10) Patent No.: US 7,313,387 B2
(45) Date of Patent: Dec. 25, 2007

(54) METHOD FOR OPERATING A TELECOMMUNICATION SYSTEM AND TELECOMMUNICATION ARRANGEMENT

(76) Inventors: Rolf-Peter Käter, Heubergstrasse 1, Baldham (DE) 85598; Joachim Esser, Brückenstrasse 1-3, Köln (DE) 50667; Donald Müller-Judex, Rotwandweg 8, Weyarn (DE) 83629; Peter Michael Horst, Reiffenstuelstrasse 9, Gmund (DE) 83703; Jörg-Ulrich Wölfel, Untere Parkstrasse 26, Haar (DE) 85548

( * ) Notice: Subject to any disclaimer, the term of this patent is extended or adjusted under 35 U.S.C. 154(b) by 128 days.

(21) Appl. No.: 10/182,522

(22) PCT Filed: Jan. 31, 2001

(86) PCT No.: PCT/EP01/01009

§ 371 (c)(1),
(2), (4) Date: May 20, 2003

(87) PCT Pub. No.: WO01/58118

PCT Pub. Date: Aug. 9, 2001

(65) Prior Publication Data

US 2003/0186687 A1    Oct. 2, 2003

(30) Foreign Application Priority Data

Jan. 31, 2000    (DE)    ............... 100 04 066

(51) Int. Cl.
    H04M 3/42    (2006.01)
(52) U.S. Cl. ............... 455/414.1; 379/92.01
(58) Field of Classification Search ................ 455/414, 455/445, 456, 517, 518, 459, 460, 461, 435, 455/515; 379/92.01, 92.02

See application file for complete search history.

(56) References Cited

U.S. PATENT DOCUMENTS

| | | | |
|---|---|---|---|
| 4,899,369 A | | 2/1990 | Kondziela |
| 4,922,520 A | * | 5/1990 | Bernard et al. .......... 379/88.11 |
| 5,738,583 A | | 4/1998 | Comas et al. |
| 5,742,668 A | * | 4/1998 | Pepe et al. .................... 455/415 |
| 5,942,969 A | | 8/1999 | Wicks |
| 5,999,808 A | | 12/1999 | LaDue |
| 6,052,591 A | * | 4/2000 | Bhatia ......................... 455/445 |
| 6,091,961 A | * | 7/2000 | Khalil ......................... 455/466 |
| 6,208,866 B1 | * | 3/2001 | Rouhollahzadeh et al. ................. 455/456.5 |
| 6,418,308 B1 | * | 7/2002 | Heinonen et al. ......... 455/414.3 |
| 6,505,046 B1 | * | 1/2003 | Baker ......................... 455/456.3 |
| 6,505,406 B2 | * | 1/2003 | Robertson et al. ............. 33/1 G |
| 6,522,877 B1 | * | 2/2003 | Lietsalmi et al. ......... 455/422.1 |
| 6,549,768 B1 | * | 4/2003 | Fraccaroli ................ 455/456.3 |
| 6,647,257 B2 | * | 11/2003 | Owensby ................. 455/414.1 |
| 6,683,943 B2 | * | 1/2004 | Wuelly .................... 379/93.13 |

(Continued)

FOREIGN PATENT DOCUMENTS

DE    198 19 582 A1    4/1998

(Continued)

*Primary Examiner*—Fan Tsang
*Assistant Examiner*—Olisa Anwah
(74) *Attorney, Agent, or Firm*—Leydig, Voit & Mayer, Ltd.

(57) ABSTRACT

The invention relates to a method for operating a telecommunication system, including in particular a mobile radio network (PLMN), to provide a service and to obtain information.

21 Claims, 1 Drawing Sheet

U.S. PATENT DOCUMENTS

| | | | |
|---|---|---|---|
| 6,829,334 B1 * | 12/2004 | Zirngibl et al. | 379/88.17 |
| 6,859,524 B2 * | 2/2005 | Unger et al. | 379/88.16 |
| 6,996,413 B2 * | 2/2006 | Inselberg | 455/517 |
| 2004/0076275 A1 * | 4/2004 | Katz | 379/93.12 |

FOREIGN PATENT DOCUMENTS

| | | |
|---|---|---|
| DE | 198 33 218 A1 | 7/1998 |
| WO | WO 93/22865 | 11/1993 |

* cited by examiner

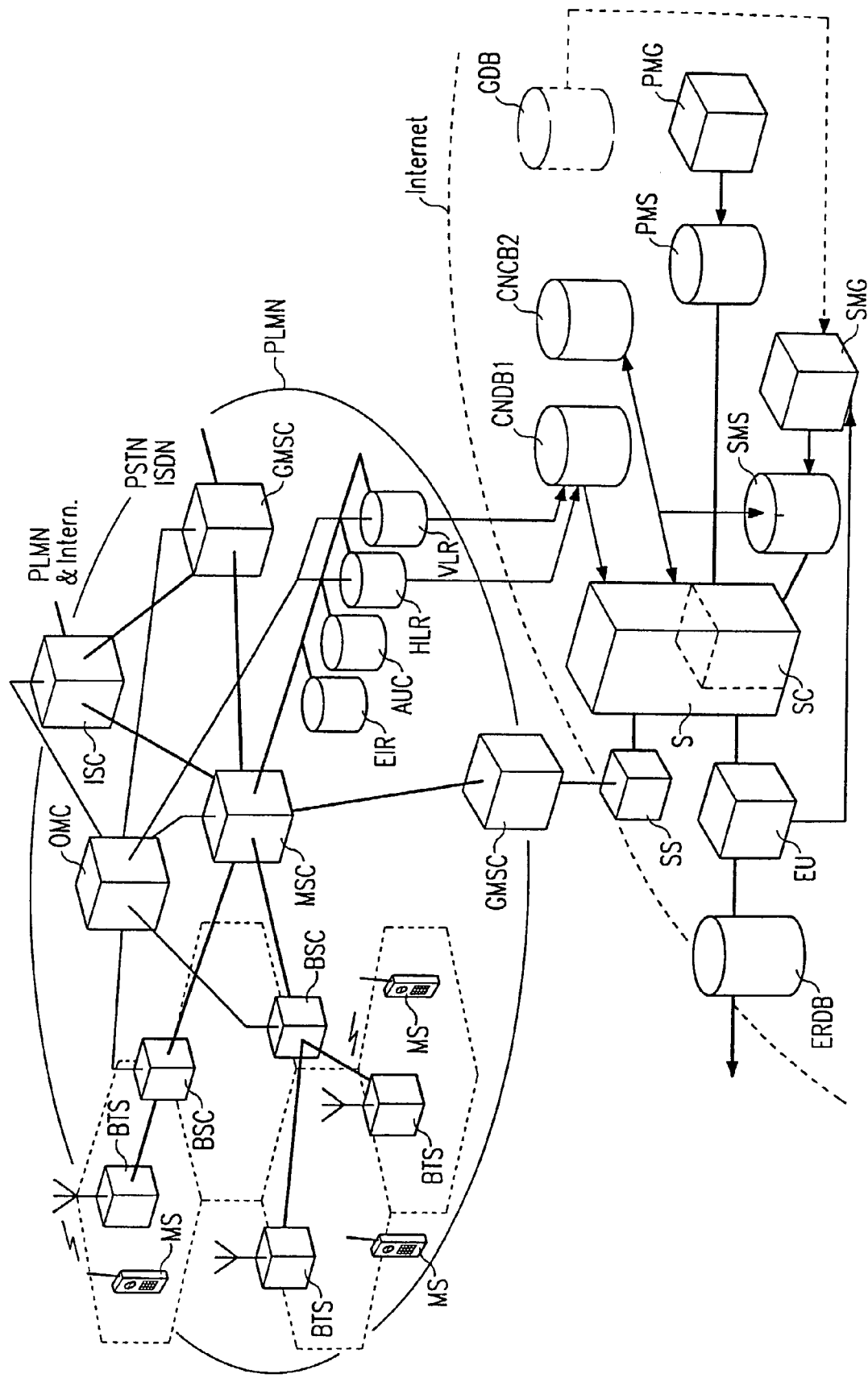

METHOD FOR OPERATING A TELECOMMUNICATION SYSTEM AND TELECOMMUNICATION ARRANGEMENT

DESCRIPTION

The invention relates to a method for operating a telecommunications system, including in particular a mobile radio network, to provide a service and to obtain information, as well as an arrangement to implement this method.

The dramatic development of the technology and infrastructure underlying mobile radio equipment in recent years has caused mobile communication to become a characteristic element of daily life in the industrialized countries. Mobile telephones have now been established far beyond the realm of professional use, as a means of communication for the entire population from juveniles to pensioners. The users of mobile phones are thus largely representative of the population in industrialized countries as a whole.

One result is that information about the users of mobile phones is extremely valuable, for the manufacturers, retailers and servicers of consumer goods as well as for governmental and social agencies etc.

In addition, in view of the high production and hence purchasing costs, everyone involved in mobile radio systems needs to ensure that the mobile phone is not only employed as primarily intended, as a means for bilateral transfer of information for the user's professional and private purposes, but also becomes more useful by the provision of extra services. Towards this end, games are incorporated into the mobile phone, and information channels and service offers are provided by the network operators.

Linking of the mobile radio network to the internet has already been introduced—at present on the basis of the WAP (Wireless Application Protocol) and employing the simplified data communication language WML (Wireless Markup Language)—and in the near future will open up a great number of new possibilities and further increase the acceptance and utilization of mobile radio technology on one hand, and of the internet on the other hand.

The German patent DE 693 09 682 discloses a hotel communication facility with a PABX coupling network, which is capable of responding to a call originating in a guest room so as to deliver automatically information requested by the caller, or to provide another service. The operating procedure of this telecommunications installation comprises the storage of a plurality of terminal-device call numbers belonging to the system and the generation of primary and secondary (response) messages as well as evaluation of the primary message, which in this case originates from the terminals in the guest rooms. As the end result of working through a menu, a particular item of information is conveyed to the terminal from which the primary message was sent.

The patent DE 198 33 218 A1 describes a telephone game system, one feature of which is that the participants are counted. In connection with this counting, an identification is provided so that when the total calls made by a given participant reaches a prespecified number, that person can be identified as a winner of the game and notified accordingly. In this procedure, again, there are primary and, in response thereto, secondary messages, and depending on the result of evaluating the primary message transmission of a particular secondary message (i.e., notification of winning) can be initiated.

The patent U.S. Pat. No. 4,899,369 discloses a so-called audiotex service in which the items on offer are presented in a display resembling a radio station finder. By pressing particular keys on a telephone keyboard, the user can set memory markers and thus call up a selection of the information available. Here, too, a primary message is sent out by the user's terminal and in response, following evaluation of the primary message, a secondary message is produced and sent out by the system processor.

The patent DE 198 19 582 A1 presents a teaching about the location-dependent provision of services within a mobile radio network, in particular the location-dependent charges imposed or the performance of route- or region-related tasks. By evaluating information regarding the location of the participant, from a service plan that describes the location dependence of the services provided, a current service profile applicable to the participant is derived. From this there can be derived a message to be transmitted to the participant.

In this context, it is the objective of the invention to disclose a method for operating a telecommunications system, including in particular a mobile radio network, with which in an ingenious linkage that ensures a high degree of user acceptance an attractive service is offered, while on the other hand information can be collected about the person making use of this offer. A further objective of the invention is to disclose an arrangement suitable for implementing this method.

This objective is achieved with respect to its methodological aspect by a method with the characteristics given in Claim 1 and with respect to the apparatus by an arrangement with the characteristics given in Claim 13.

The invention includes the essential idea that in a multi-stage sequence of reaction and response steps, users of telecommunications terminals (in particular mobile telephones) are presented with a specific set of in particular recreation-oriented services, and in case of a positive response the recreation-oriented service is immediately provided to the user by way of his terminal, during which process particular items of information are obtained and stored. This information comprises in particular the (verified) user call number, the geographic region in which the user is located, and where appropriate information about the individual, his leisure interests, his requirements regarding goods and services, etc. There are many possible ways of accomplishing this, depending on the nature of the services (forms of recreation) on offer and the kinds of information transmitted in this connection. The provider using the proposed system can therefore satisfy the information requirements of customers in a differentiated manner, given that the method is suitably implemented. Moreover, advertisements can be incorporated into the transmitted information, which further enhance the economical value of the proposed invention.

In a first preferred embodiment, which can fundamentally be implemented in cooperation with network operators, as a first call-number database at least one home location register or a visitor location register of a cellular mobile radio network can be used. In this variant, therefore, the method starts with an already verified quantity of user call numbers. As an alternative—without making use of the information base of a network operator—the method can start on the basis of arbitrarily synthesized numbers, or prespecified ranges of call numbers can be "scanned out".

For application with a mobile radio network, information regarding the current location of the user, based on the position of his terminal, can be obtained from his allocated place in the visitor location register of a special mobile switchboard or else from the connection status with respect to a special base station of the network. It is known that the dynamic cell structure of mobile radio networks allows a specific user to be located. Here again, however, an appropriate implementation of the method is possible only in collaboration with the network operator, who has the relevant information at his disposal and, where its use is concerned, is subject to both legal stipulations and rules anchored in the system standard. When the method is applied in a public land-based network, spatial information can relatively easily be generated on the basis of the geographical reference encoded by the telephone number.

The messages exchanged within the scope of the method can be transmitted in speech or text form—the latter according to the permitted standards, for example SMS (Short Message Service) and WAP (Wireless Application Protocol) in the GSM mobile network. The choice of a specific format will depend on the nature of the service on offer and the target group, but also on the further technical development with respect to the transmission and display of text messages.

In an embodiment of the method that comprises more than two stages, in particular the secondary messages—in addition to the primary messages—contain requests for a response, and in the server means are provided for evaluating the response message thus obtained and for storing the results of the evaluation.

In a preferred design of the method the recreational service being offered is a game or quiz or a service to pave the way for relationships between individual users of the telecommunications system (forming interest groups, making new acquaintances, etc.). Here the primary message gives the basic information and inquires whether the user being addressed is willing to participate. With the very first response message the service operator receives valuable information consisting at least in the verification of a previously arbitrarily generated telephone number and/or information about the location of the person involved, as well as in the fact that this individual is interested in the specified offer. Subsequently one or more secondary messages are used to provide the rules for the game or information as to its progress and—given a suitable internal structure of the game or knowledge contest, or of the criteria for initiating personal relationships—to derive additional information from the messages received in response and store it in the database for evaluation results.

In an advantageous design of the method this process generates individual user profiles, which on one hand, in the case of a service for creating personal relationships, are used to implement this service, and on the other hand represent valuable information for commercial clients of the service provider.

In an especially advantageous implementation of the method the database for evaluation results is used to filter the secondary messages in dependence on the items of information received along with the response messages. The progress of the game or contest or the initiation of relationships is thereby made dependent on the current status of the information in each case.

In another preferred embodiment the secondary messages—at least in some stages of the method—are produced by employing memory contents of the database for evaluation results. This also enables cross-connections between individual memory regions to be produced, such that for example—naturally after the affected person has presented an appropriate declaration of agreement—telephone numbers of unfamiliar subscribers to the telecommunications system are given to a participant in the game. On this basis it is also possible to organise partner games under the direction of the service provider, who also monitors the results and finally determines the ranking of the participants and assigns the prizes.

An arrangement for implementing the proposed method is distinguished in particular by the presence of a first and a second call-number database as well as a database for evaluation results, such that the second number database and the evaluation database accumulate the user-related information acquired as the execution of the method proceeds. A primary- and a secondary-message memory—the latter of which can store the secondary-messages in a hierarchically stacked arrangement—constitute the system-side database employed as the method proceeds, and a progress-control unit incorporated into the server as well as one or more server terminals are used to implement the method. The term "server terminal" should be understood, depending on the specific design of the arrangement, to mean a telecommunications terminal device or a data-communication terminal or a data-communication interface.

In an arrangement constructed for an especially rational implementation of the method, a primary-message synthesis unit and/or a secondary-message synthesis unit is/are provided to automatically or semiautomatically synthesise the speech and text of the messages on the basis of information either programmed in or read out from a database. It is of course also possible to implement the method within the organisational framework of a call centre, in which case each of the agents makes use of the information stored in the message memories and the call-number databases.

Depending on the particular form taken by the method, the relevant databases also include a database for the rules of the game or for the answers to questions in a knowledge contest, etc. It has been pointed out above that in an advantageous embodiment of the method the database for evaluation results and the second call-number database are connected to the secondary-message synthesis unit, or can be accessed by an agent in the call centre in case the method is being carried out by a person.

An efficient means of implementing the method is to send out, at least phase-wise, a plurality of messages in parallel, in particular by means of the cell broadcast method. On this basis it is also possible to play games in which it is a matter of the quickness of the participants' responses or of concluding the game as a whole as rapidly as possible.

Other advantages and useful features of the invention will be evident in the subordinate claims and in the following description of a preferred exemplary embodiment of the invention with reference to the figure. The figure is a schematic drawing to show an arrangement for implementing the method by way of the Internet and, connected thereto, a GSM mobile radio network PLMN.

The structure of the mobile radio network PLMN is known per se and need not be explained in detail here. Mobile stations (mobile phones) MS are linked within a dynamic cell structure, each being connected by way of a base station BTS/BSC to a mobile switching centre MSC. To the mobile switching centre MSC are assigned a plurality of databases; those sketched in the figure are the equipment identity register EIR, the authentication centre AUC, the home location register HLR and the visitor location register VLR.

The mobile switching centre MSC is connected to other mobile radio networks PLMN—also at an international scale—by way of an international switching centre ISC. The mobile switching centre MSC also communicates, by way of a first gateway mobile switching centre GMSC, with the public switched telephone network PSTN or an ISDN telephone network ISDN, and by way of a second gateway mobile switching centre GMSC it is linked to the system belonging to the provider of a service in the framework of the present invention, as described below in-greater detail.

The service provider operates a server S, which by way of a server terminal SS—for example, a data interface of suitable capacity—is connected to the gateway mobile switching centre GMSC of the mobile radio network PLMN. The server S comprises a controller SC, by way of which the execution of the method proceeds.

To the server S is assigned a first call-number database CNDB1, which obtains its supply of data from the home location register and the visitor location register belonging to the mobile switching centre MSC. The server S also has access to a second call-number database CNDB2, the data content of which is gradually built up as the method is carried out. In a primary message store PMS is deposited a primary message or set of primary messages, which is/are generated on the basis of content prespecified in a primary-message synthesis unit PMG.

Also associated with the server S is a secondary-message store SMS, in which individually addressable memory regions contain a plurality of secondary messages that have been generated by a secondary-message synthesis unit SMG. In a special embodiment, in which the method is employed for the playing of a game, generation of the secondary messages by the secondary-message synthesis unit involves input of the game-rule data content of a game-rule database GDB, which is drawn in dashed outline to indicate that it is optionally provided.

On the output side the server S is connected to an evaluation unit EU to evaluate the response messages received by way of the server terminal SS, the output of which is connected to an evaluation-result database ERDB. This is accessible from outside—as symbolized by an arrow pointing outward—according to certain rules established with the service provider. The evaluation unit EU is additionally connected to an input of the secondary-message synthesis unit SMG, so that the evaluation results can be incorporated into the generation of secondary messages.

The way in which the illustrated arrangement functions will be evident from the above general discussion of the execution of the method.

The implementation of the invention is not restricted to the arrangement presented here as an example or to the method described and applications cited above, but is equally possible in a large number of modifications that are within the competence of a person skilled in the art.

| List of reference symbols | |
|---|---|
| AUC | Authentication centre |
| BTS | Base transceiving station |
| BSC | Base station controller |
| CNDB1 | First call-number database |
| CNDB1 | Second call-number database |
| EIR | Equipment identity register |
| ERDB | Evaluation-result database |
| EU | Evaluation unit |
| GDB | Game-rule database |
| GMSC | Gateway MSC |
| HLR | Home location register |
| ISC | International switching centre |
| ISDN | ISDN telephone network |
| MS | Mobile station |
| MSC | Mobile switching centre |

-continued

| List of reference symbols | |
|---|---|
| OMC | Operation and maintenance centre |
| PLMN | Public land mobile network |
| PMG | Primary-message syntheis unit (generator) |
| PMS | Primary-message storage |
| PSTN | Public switched telephone network |
| S | Server |
| SC | Service controller |
| SMG | Secondary-message syntheis unit (generator) |
| SMS | Secondary-message storage |
| SS | Server terminal |
| VLR | Visitor location register |

The invention claimed is:

1. A method for operating a telecommunications system, including a mobile radio network, to provide a service and to obtain information, comprising:

storing a plurality of terminal call numbers of the telecommunications system in a first call-number database comprising at least one visitor location register of the mobile radio network, the mobile radio network generating a primary message for initiating a communication, the primary message comprising at least one information component, a response request standardized in accordance with an evaluation algorithm for producing a plurality of secondary messages, and a call number of a server terminal, storing the primary message in a primary-message store of a server, the mobile radio network producing the plurality of secondary messages associated with the primary message, the plurality of secondary messages having content dependent on one or more of (a) at least one information element in a response message produced in reaction to the primary message, and (b) a terminal call number associated with the response message, and (c) a geographic position of a terminal reacting to the primary message, and depositing the plurality of secondary messages in a secondary-message store, the server terminal initiating the communication by sending, sequentially or in parallel, the stored primary message to the call numbers stored in the first call-number database, receiving response messages by the server terminal with recording of a sender's call number and a geographic position of a sender's terminal, evaluating each received response message according to the evaluation algorithm and creating an evaluation result, storing the sender's call number in a storage region of a second call-number database, storing the evaluation result and the geographic position in association with the sender's call number in an evaluation-result database to generate individual user profiles, addressing a storage region of the secondary-message store depending on the evaluation result and readout of the stored secondary message as well as the associated storage region in the second call-number database to the server terminal and sending the stored secondary message to the sender's terminal during the communication, wherein an approximate geographic position of the sender's terminal is found from one of (a) the terminal's place in the visitor location register of a special mobile switching center and (b) from the status of its connection to a special base station of the mobile radio network.

2. The method according to claim 1, wherein the information component of the primary message comprises information about rules of a game or at least one question, and the response request comprises a request for speech or text input.

3. The method according to claim 1, wherein the primary message or the secondary messages are formulated as in particular synthetic speech or text messages in SMS or WML format for output by way of a receiver cap or display, respectively, of a mobile telephone.

4. The method according to claim 1, wherein the secondary messages comprise response requests, and the steps involved in reception and evaluation of response messages as well as in storing the evaluation result are repeated after the secondary messages have been sent, on multiple occasions separated by the sending of follow-up messages.

5. The method according to claim 4, wherein at least some of the sequentially transmitted secondary messages contain information regarding the progress of the game or questions, and at least some of the various response messages contain information regarding moves to be made in the game or answers.

6. The method according to claim 1, wherein by way of the evaluation-result database a filter device associated with the secondary-message store is controlled in such a way as to filter out secondary messages depending on information received with the response messages.

7. The method according to claim 1, wherein secondary messages are produced from contents of memory in the evaluation-result database.

8. The method according to claim 7, wherein depending on the result obtained by evaluating a plurality of response messages, at least one unfamiliar terminal call number or an evaluation result concerning an unfamiliar user of the telecommunication system is integrated into secondary messages.

9. The method according to claim 1, wherein depending on the result obtained by evaluating a plurality of response messages, identical secondary messages are sent to a plurality of different terminal call numbers from the second call-number database.

10. An arrangement for operating a telecommunications system, including a mobile radio network, comprising:

a server with a control unit and at least one server terminal, a first call-number database, that comprises one of at least one home register and at least one visitor location register of the mobile radio network, the first call-number database configured to store a plurality of terminal call numbers of the telecommunications system, the plurality of terminal call numbers including a user's call number, a second call-number database configured to store the user's call number, a primary-message and a secondary-message store associated with the server, wherein the at least one server terminal is capable of (a) initiating a communication by sending a primary message to the plurality of terminal call numbers and (b) sending a secondary message to the user's call number responding to the primary message, an evaluation unit to evaluate response messages that are received from the user's call number, an evaluation-result database connected to the evaluation unit, wherein the evaluation-result database is configured to store an evaluation result and a geographic position in association with the user's call number to generate individual user profiles, wherein the primary message comprises at least one information component, a response request standardized in accordance with an evaluation algorithm for producing a plurality of secondary messages, and a call number of the at least one server terminal, and wherein the secondary message comprises a content depending on one or more of (a) at least one information element in a response message produced in reaction to the primary message, and (b) a terminal call number associated with the response message, and (c) a geographic position of a terminal reacting to the primary message.

11. The arrangement according to claim 10, wherein for an automatic sequential or parallel transmission of primary or secondary messages, the first or second call-number database is connected to a control input of at least one server terminal.

12. The arrangement according to claim 10, wherein for an automatic evaluation of the response messages, the evaluation unit is connected to a data output of each server terminal.

13. The arrangement according to claim 10, wherein a primary-message synthesis unit or a secondary-message synthesis unit for computer-assisted generation of primary or secondary messages, constructed as a speech-synthesis unit or a text-synthesis unit operate according to an SMS or WML standard.

14. The arrangement according to claim 10, wherein the telecommunications system is designed as a mobile radio system or comprises an IP network linked to a mobile radio network by way of a gateway mobile switching center.

15. The arrangement according to claim 10, further comprising a random-variable generator connected to one input of the first call-number database.

16. The arrangement according to claim 13, further comprising a game-rule database connected to one input of the primary-message synthesis unit or the secondary-message synthesis unit.

17. The arrangement according to claim 10, wherein the evaluation-result database is connected to a control input of a filter device associated with the secondary-message store.

18. The arrangement according to claim 16, wherein the secondary-message synthesis unit includes an input side connected to an output of the evaluation unit or of the evaluation-result database.

19. The arrangement according to claim 16, wherein the secondary-message synthesis unit includes an input side connected to the second call-number database.

20. The arrangement according to claim 10, wherein the control unit and the server terminal are designed for sending in parallel a plurality of primary messages or secondary messages, by a cell broadcast method.

21. A method for operating a mobile radio system, said mobile radio system comprising a server terminal having at least one server terminal call number associated therewith and a plurality of mobile terminals, each mobile terminal having a mobile terminal call number associated therewith, said server terminal having a user profile database that comprises a plurality of records, each record in said user profile database being associated with one mobile terminal, said method comprising:

storing a plurality of said mobile terminal call numbers in at least one visitor location register of said mobile radio system;

generating and storing, at said server terminal, a primary message in a primary message store, said primary message comprising
at least one information component,
said server terminal call number and
a response request standardized in accordance with an evaluation algorithm for producing at least one of a secondary message and at least one follow-up message;

determining, at said server terminal, at least one mobile terminal call number in said first plurality of mobile terminal call numbers having no record in said user profile database associated therewith;

initializing communication with a target mobile terminal having one of said at least one mobile terminal call number by sending said stored primary message to said mobile terminal call number;

generating and sending, at said target mobile terminal, a first response message in response to said primary message comprising at least one information element;

receiving, at said server terminal, said first response message from said target mobile terminal;

determining, at said server terminal, an approximate geographic position of said target mobile terminal based on information pertaining to said target mobile terminal stored in said visitor location register;

generating, at said server terminal, said secondary message, the content of which depends on said approximate geographic position of said target mobile terminal and said at least one information element of said first response message;

sending, at said server terminal, said secondary message to said target mobile terminal;

generating and sending, at said target mobile terminal, a second response message in response to said secondary message, said second response message comprising at least one information element;

receiving, at said server terminal, said second response message; generating, at said server terminal, said at least one follow-up message;

sending, at said server terminal, said at least one follow-up message to said target mobile terminal;

generating and sending, at said target mobile terminal, at least one third response message in response to said at least one follow-up message;

receiving, at said server terminal, said at least one third response message;

generating, at said server terminal, an individual user profile in association with said target mobile terminal and storing in said user profile database a record comprising:
said at least one mobile terminal call number,
data indicative of said approximate geographical position, and
data extracted from at least one of said first response message, said second response message and said at least one third response message;

wherein at least one of said secondary and said at least one follow-up message contains information about a game and at least one of said second response message and of said third response message contains information regarding moves of said game.

* * * * *